April 23, 1963  O. E. NELSON  3,086,611
ENGINE MUFFLER
Filed April 14, 1961  2 Sheets-Sheet 1

INVENTOR.
OSCAR E. NELSON
BY
ATTORNEY

April 23, 1963   O. E. NELSON   3,086,611
ENGINE MUFFLER

Filed April 14, 1961   2 Sheets-Sheet 2

INVENTOR.
OSCAR E. NELSON
BY
Dale A. Winnie
ATTORNEY

# United States Patent Office 3,086,611
Patented Apr. 23, 1963

3,086,611
ENGINE MUFFLER
Oscar E. Nelson, 19332 Exeter, Detroit 3, Mich.
Filed Apr. 14, 1961, Ser. No. 103,080
5 Claims. (Cl. 181—53)

This invention relates to engine mufflers in general and more particularly to engine mufflers for automobiles, trucks, buses and the like.

Engine mufflers are required to be compact and sturdy in construction and to be resistant to corrosive acids formed by condensate and exhaust gases. Mufflers used for automotive engines, in particular, are required to be especially compact and sturdy in construction in view of the limited space available under the vehicle body and the damage prone disposition thereof. Further, the short city driving of most automotive vehicles subjects the automotive muffler to more corrosive action due to the collection of condensate and the lack of opportunity to fully dry out the corrosive acids which are formed.

Present mufflers include multiple exhaust gas passages arranged for attenuating engine exhaust noises by baffled passage of the exhaust gases therethrough. In general, such mufflers include internal passage-forming conduits arranged and interconnected within an outer shell or casing. Both the flow conduit and the casing are required to be of heavy and sturdy construction to resist the corrosive effects to which both are subjected.

Most mufflers fail internally, unbeknown to their users, before any visual or audible indication is given thereof. In some instances this internal failure will cause blocked or obstructed passages and undesirable engine back pressures which affect the operation of the engine. The noise attenuation is also less, but is normally unappreciated until a rupture occurs in the outer casing.

Mufflers provided by manufacturers of present day automobiles are seldom expected to last more than two years. This is most discouraging to car owners who normally keep their cars for a longer period of time and must have new mufflers installed. Replacement manufacturers offer new mufflers "for the life of your car" well knowing that the purchasers will seldom retain a car more than an additional two or three years after replacement and a slightly heavier gauge construction will normally suffice through this time.

It is an object of this invention to provide a more durable muffler having a longer serviceable life and comprising a new and novel construction to assure these advantages.

It is an object of this invention to provide a muffler of more simple construction than present mufflers, requiring fewer parts and less problems of assembly. The more simple construction enables parts to be of heavier gauge material and still provides a muffler of less overall weight.

It is also an object of this invention to teach a muffler construction wherein internal and external walls serve multiple purposes and are disposed and arranged to accomplish the desired objectives in a new and better way. More specifically:

It is an object of this invention to provide a muffler having interconnected internal flow passages with common dividing walls and a common external wall which also serves as the muffler casing.

It is also an object of this invention to teach the use of passage-forming wall members to cooperatively form an internal flow-passage through which hot exhaust gases may be received and wherein the heat thereof may be dissipated to closely adjacent outer disposed flow passages.

It is a further and still more specific object of this invention to provide an engine muffler having a centrally disposed passage receptive of the hottest exhaust gases and inclusive of external passageways thereabout through which the exhaust gases travel in a circuitous route. The passages are formed by radially disposed walls providing both the internal and external passages and are enclosed within a simple external casing or shell which also serves as a passage wall. The through-flow of exhaust gases, the use of common dividing walls to provide the flow passages, and the arrangement and disposition of the flow passages assures against the collection of condensate and guarantees a longer serviceable life for the muffler in addition to that obtained in the use of heavier gauge material with less overall weight.

These and other objects and advantages to be gained in the practice of this invention will be more fully appreciated upon a reading of the following description of a working embodiment of this invention and with reference to the accompanying drawings.

Figure 1:
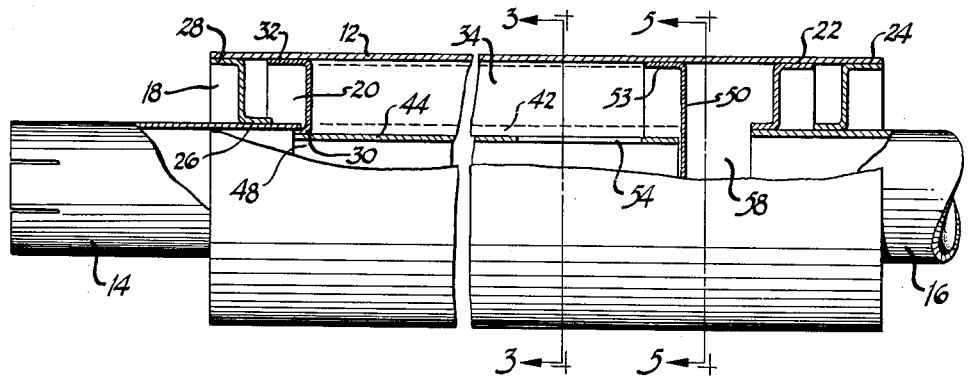
FIGURE 1 is a plan view of a muffler embodying the principles of this invention having a part thereof shown in longitudinal cross section.
Figure 2:
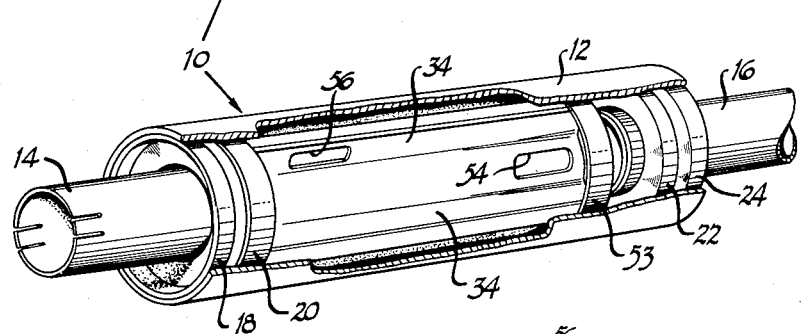
FIGURE 2 is a perspective view of the muffler shown by FIG. 1, on a reduced scale, and having the outer wall thereof broken away to better illustrate the internal structure thereof.

The muffler 10, shown by FIGURES 1 and 2, includes an outer shell or casing 12 having an inlet conduit 14 provided within one end thereof and an outlet conduit 16 disposed at the other end thereof. The inlet conduit 14 is supported within the end of the outer casing or shell 12 by collar members 18 and 20. The collar members 18 and 20 are disposed in parallel spaced relation to each other and both serve as closure members as regards the annular space between the inlet conduit 14 and the muffler casing 12.

A similarly disposed pair of collar members 22 and 24 are disposed at the other end of the muffler to support the outlet conduit 16 therein and close the other end of the muffler casing 12.

The collar members 18, 22 and 24 are similar in construction in that each includes an internal flange 26 and an external flange 28 disposed in opposite directions and respectively engaged with the flow conduits extending therethrough and the inner wall of the muffler casing 12.

The closure collar 20 has the internal and external flanges thereof, 30 and 32 respectively, disposed on the same side thereof. The external flange 32 is engaged to the inner wall of the muffler casing 12 and the inner flange 30 is received and engaged within the inner end of the inlet conduit 14. This arrangement affords a flush wall surface on the inner side of the collar member 20 at the inlet end of the muffler.

Figure 4:
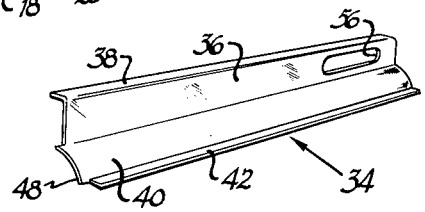
FIGURE 4 is a perspective view of one of the baffle and internal conduit forming plate members.

Within the muffler casing or shell 12 are disposed a plurality of baffle plates 34 which are best shown by FIGURE 4. Each baffle plate includes a baffle wall 36 having a right angle flange 38 provided along one edge thereof, a semi-cylindrical section or roll 40, and a flange 42 provided along the other edge thereof in substantially parallel spaced relation to the right angle flange 38.

Figure 3:
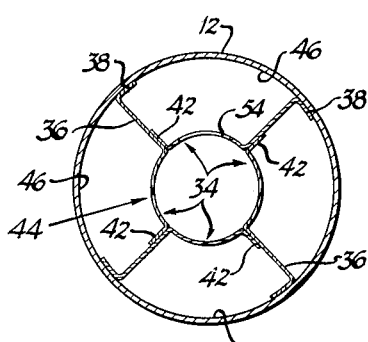
FIGURE 3 is a cross-sectional view taken through the muffler shown in FIGURE 1 in the plane of line 3—3 and as viewed in the direction of the arrows thereon.

Referring now to FIGURE 3, it will be seen that the baffle plates 34 are arranged in combination to provide an internal conduit 44 centrally within the muffler casing 12 by the juxtapositioning of the semi-cylindrical sections 40 of each baffle plate member. The baffle walls 36 are radially disposed and divide the annular space between the outer casing 12 and the internal conduit 44 into quadrant segments which, as will be shown, serve as the baffle passages 46. The flanges 38 of each baffle plate are engaged to the inner wall of the outer casing 12. The other flanges 42 are each secured to the next adjacent baffle wall 36.

In the arrangement disclosed, each baffle plate has the semi-cylindrical section 40 extended at one end thereof to provide an alignment member 48 which is received within the inner end of the inlet conduit 14 and assures alignment of the internal conduit 44 with the inlet conduit 14. As will be appreciated, a different arrangement may be used at this junction to accomplish the same objective. However, the arrangement shown has been found to be a particularly simple and most suitable arrangement for accomplishing the desired objective.

Figure 5:
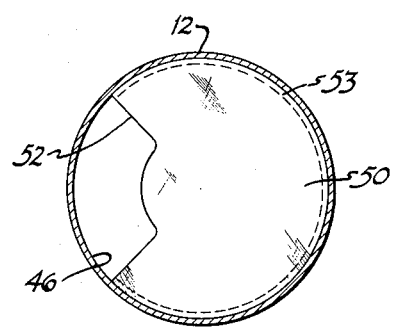
FIGURE 5 is a cross-sectional view of the baffle passage closing end wall used in the muffler shown by FIGURES 1 and 2 as seen in the plane of line 5—5 in FIGURE 1.

With the baffle walls 36 of the different baffle plates 34 engaged to the inner side of the collar member 20, the baffle passages 46 are closed at the inlet end of the muffler. A closure wall 50 is provided at the other end of the baffle plate 34 for closing all except one of the baffle passages 46. A quadrant segment thereof is cut away, as best shown by FIGURE 5, to provide an opening 52 therethrough. The closure wall 50 also includes a peripheral flange 53 which is engaged with the inner wall of the muffler casing 12 and has the external flanges 38 of the baffle plate 34 crimped, struck, or otherwise formed for locking engagement therewith (not shown).

It will be appreciated that the closure wall 50 closes the end of the internal flow conduit 44. However, a suitable opening 54 is provided through the side wall of the internal conduit near the closed end thereof. The opening 54 is actually through one of the semi-cylindrical sections 40 of one of the baffle plates 34 and allows exhaust gases to flow from the internal conduit 44 into one of the baffle passages 46.

In order to afford an opportunity for exhaust gases to flow through the different baffle passages 46 and ultimately arrive at the outlet conduit 16, suitable openings 56 are provided within certain of the baffle walls 36.

Figure 6:
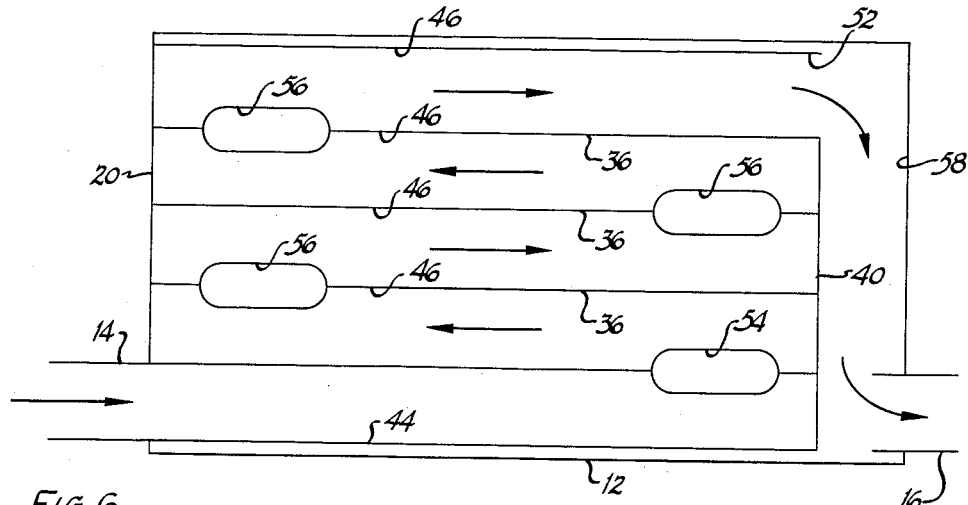
FIGURE 6 is a schematic diagram showing the flow of exhaust gases through the muffler illustrated in FIGURES 1 and 2.

Referring to FIGURE 6, the baffle passages connecting opening 56 are formed through the baffle walls 36 of each next adjacent baffle plate 34 at respectively opposite ends thereof. The opening 56 communicating with the inlet connected baffle passage 46 is provided through one of the baffle passage-forming walls 36 in spaced relation to the opening 54 through which exhaust gases enter the first baffle passage. The opening in the next adjacent baffle wall 36 is provided therethrough in spaced relation to the opening provided through the preceding wall, and successively on. This provides a circuitous route for the flow of exhaust gases through the different baffle passages 46 and affords an attenuation of engine and exhaust noises which would not otherwise be present.

The last of the successively disposed baffle passages 46 is next adjacent to the first baffle passage and, accordingly, no communicating opening is provided therethrough. Instead, the exhaust flow from the last successive baffle passage 46 is through the cutaway opening 52 provided in the closure wall 50. Exhaust gases from this last passage are collected within the exhaust passage chamber 58 and from there flow through the outlet conduit 16.

Before describing the attributes of the engine muffler 10, another form of muffler of somewhat simpler construction will be described.

Figure 7:
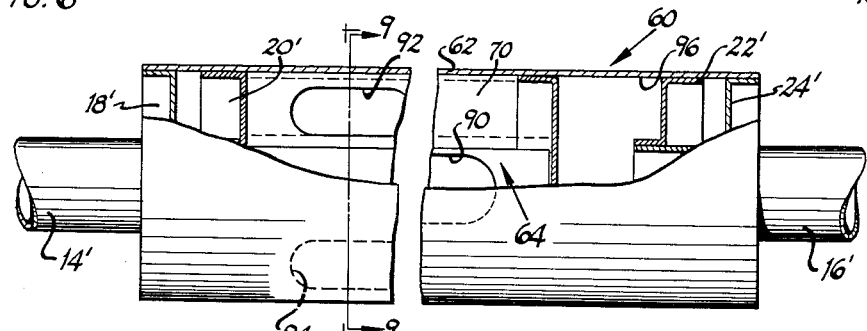
FIGURE 7 is a plan view of another type of exhaust muffler embodying the principles of this invention shown partially in longitudinal cross section.
Figure 8:
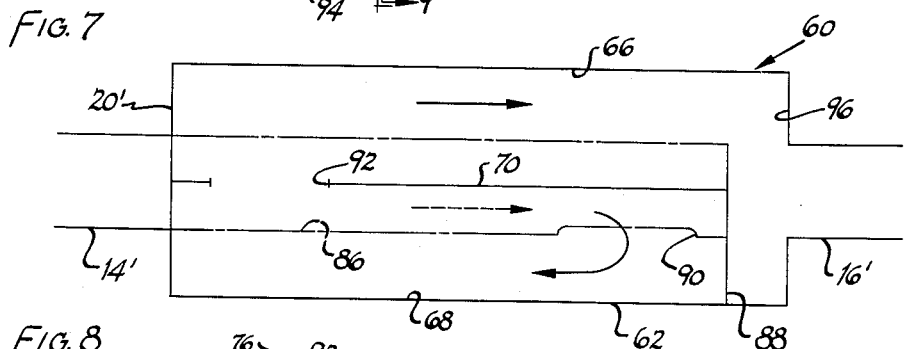
FIGURE 8 is a schematic illustration of the exhaust muffler of FIGURE 7 and showing the exhaust gas flow therethrough.
Figure 9:
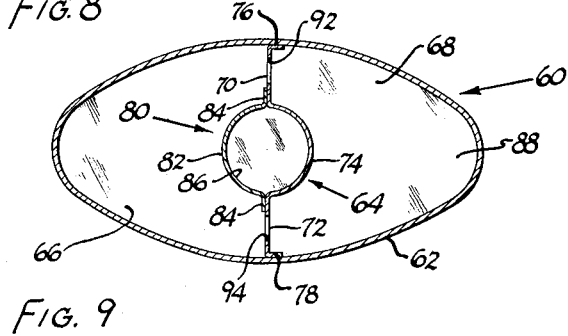
FIGURE 9 is a cross-sectional view of the muffler shown by FIGURE 7 as seen in the plane of line 9—9 thereof.

Referring to FIGURES 7-9 there is shown a simple reverse flow muffler 60. This muffler includes an outer elliptical casing 62 having inlet and outlet conduits 14' and 16' provided within opposite ends thereof and supported by collar members 18' and 20' at one end and 22' and 24' at the other end thereof. The collar members, again serve to close the ends of the muffler casing and to center and support the conduits received therethrough.

The muffler 60 includes a single baffle plate member 64 which divides the internal space within the casing 62 into two separate passage areas 66 and 68 on opposite sides thereof. The baffle plate member 64 is formed to include longitudinally disposed baffle walls 70 and 72 having a semi-cylindrical wall portion 74 provided therebetween. Suitable flanges 76 and 78 are formed on the edges of the baffle plate member for engagement with the inner wall of the outer casing 62.

A passage-forming part 80, itself including a semi-cylindrical section 82 and suitable baffle wall engaging flanges 84, is secured to the baffle plate member to form an internal flow passage 86 which is in communication with the exhaust gas receptive inlet conduit 14'.

As in the exhaust muffler 10, the closure wall 88 is provided to close the internal passage 86 and one of the baffle passages 68. Also, an opening 90 is formed through the internal passage-forming section 74, near the closure wall 88, to enable exhaust gases to flow from the internal passage into the baffle passage space 68. Suitable passage openings 92 and 94 are formed through the baffle walls 70 and 72 at the opposite ends of the baffle plate to enable exhaust gas flow into the other baffle passage 66. The exhaust gases flow from the baffle passage 66 through the outlet chamber 96 which is in open communication therewith and on out through the outlet conduit 16'.

The engine mufflers 10 and 60, and variants thereof incorporating the teachings of such mufflers, have considerable advantage over conventionally known mufflers. The proposed mufflers have an internal flow passage receptive of the hottest engine exhaust gases. The flow of exhaust gases through the baffle passages disposed around this internal flow passage effects a dissipation of the exhaust gas heat and any condensate formed within the disclosed type of muffler will be exposed to both the flow of the exhaust gases and the exhaust gas heated walls which form such passages. Any condensate which is formed will be immediately carried through the passages which are formed to avoid any collecting pockets. Further, any condensate which might be trapped would be boiled off and carried through the muffler passages by exhaust gas flow.

It will also be appreciated that the use of passage-forming wall members which cooperatively form both an internal flow conduit and a common dividing wall between adjacent flow passages is a savings in material which enables heavier gauge material to be used and to still effect an overall savings in weight. The use of the external casing as a common wall for the different flow passages effects a still further savings in this regard.

In conclusion, although a preferred embodiment and one modification of this invention have been shown and described, it will be appreciated that other modifications are conceivable. Such other modifications as are within the spirit and scope of this invention are to be considered as included within the hereinafter appended claims unless specifically excluded by the language of such claims.

I claim:
1. An exhaust muffler, comprising: a plurality of radi- ally disposed baffle plates having the inner disposed edges thereof formed to provide in combination a central flow conduit, a casing provided around said baffle plates and forming therewith a plurality of flow passages annularly about said flow conduit, means provided at the inlet end of said flow conduit for closing said flow passages, means provided across the outlet end of said flow conduit for closing said flow conduit and said flow passages with the exception of one thereof, said flow conduit having an access opening provided through the side wall thereof and said baffle plates having access openings formed therethrough near successively alternate ends thereof for the circuitous flow of exhaust gases through said flow conduit and flow passages to exhaust.

2. The exhaust muffler of claim 1: said baffle plates being formed to include a flanged outer edge extending on one side thereof for engagement with said casing and a rolled and flanged inner edge extending on the other side thereof for forming a part of said flow conduit and for engagement with the next preceding of said baffle plates.

3. The exhaust muffler of claim 2: said baffle plate members having said access openings provided within the conduit forming rolled inner edge of one thereof and within the baffle walls of the others thereof.

4. The exhaust muffler of claim 1: said baffle plates including at least four in number and being diametrically aligned across said casing for structural reinforcement thereof and multifarious passage of exhaust gases about said central flow conduit prior to final exhaust.

5. An exhaust muffler, comprising: a cylindrical casing having an inlet conduit and an exhaust conduit of smaller diameter provided at opposite ends thereof, parallel spaced collar means provided within the ends of said casing for the support of said inlet and exhaust conduits and the closure of said casing therearound, and a plurality of longitudinally disposed and radially arranged baffle plates provided within said casing; said baffle plates each including a flanged outer edge secured to the inner wall of said casing, a radially disposed side wall, a rolled inner portion extending in an opposite direction to said flanged outer edge, and an inner flanged edge secured to the next adjacent of said baffle plates; said baffle plates having the rolled portion thereof forming in combination a flow conduit centrally through said casing and the side walls thereof defining flow passages annularly disposed about said central flow conduit; said baffle plates being provided within said casing and formed for communicating telescopic engagement between the flow conduit formed thereby and said inlet conduit, the outlet end of said central flow conduit being spaced from said outlet conduit, and means provided within said casing and extended across the outlet end of said central flow conduit for closing said flow conduit and said baffle plate flow passages with the exception of one thereof; and access openings provided in said baffle plates near successively alternate ends thereof for exhaust flow from said central flow conduit; circuitously through said flow passages and from said casing out through said outlet conduit.

References Cited in the file of this patent

UNITED STATES PATENTS

| | | |
|---|---|---|
| 1,002,802 | Boeck | Sept. 5, 1911 |
| 1,044,007 | Boeck | Nov. 12, 1912 |
| 1,452,056 | Stockton | Apr. 17, 1923 |
| 1,583,908 | Williams | May 11, 1926 |
| 1,701,397 | Trumble et al. | Feb. 5, 1929 |
| 1,781,001 | Eisele | Nov. 11, 1930 |
| 2,576,522 | Kyffin | Nov. 27, 1951 |
| 2,808,896 | Wilman | Oct. 8, 1957 |

FOREIGN PATENTS

| | | |
|---|---|---|
| 65,450 | Sweden | June 26, 1928 |
| 317,353 | Great Britain | Aug. 14, 1929 |